United States Patent
Momose et al.

(10) Patent No.: US 10,706,240 B2
(45) Date of Patent: Jul. 7, 2020

(54) CARD READER AND FOREIGN MATTER DETECTION METHOD

(71) Applicant: NIDEC SANKYO CORPORATION, Nagano (JP)

(72) Inventors: Munemasa Momose, Nagano (JP); Yasuhiro Kitazawa, Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 0 days.

(21) Appl. No.: 16/433,337

(22) Filed: Jun. 6, 2019

(65) Prior Publication Data
US 2019/0384945 A1    Dec. 19, 2019

(30) Foreign Application Priority Data
Jun. 18, 2018  (JP) .................................. 2018-115613

(51) Int. Cl.
| | | |
|---|---|---|
| *G06K 7/10* | (2006.01) | |
| *G06K 7/00* | (2006.01) | |
| *G06K 13/08* | (2006.01) | |

(52) U.S. Cl.
CPC ............. *G06K 7/10* (2013.01); *G06K 7/0008* (2013.01); *G06K 7/0091* (2013.01); *G06K 13/0806* (2013.01)

(58) Field of Classification Search
None
See application file for complete search history.

(56) References Cited

U.S. PATENT DOCUMENTS

| | | | | |
|---|---|---|---|---|
| 10,068,112 B2 * | 9/2018 | Ozawa | ................ | G07F 19/2055 |
| 2013/0299582 A1 * | 11/2013 | Ozawa | ................ | G06K 7/0091 |
| | | | | 235/440 |

FOREIGN PATENT DOCUMENTS

JP            2017174164 A       9/2017

* cited by examiner

*Primary Examiner* — Kristy A Haupt
(74) *Attorney, Agent, or Firm* — Cantor Colburn LLP

(57) ABSTRACT

A card reader for use with a card, the card reader may include a magnetic detector to detect magnetism from the card inserted into an insertion port; a main body part including a card conveyance path; and a card detection sensor structured to detect a tip end of the card. The magnetic detector and the card detection sensor may be disposed at a distance less than a length of the card in the insertion direction. The card reader may further include a control unit that monitors magnetism detected by the magnetic detector when the card detection sensor detects a tip end of an insert inserted into the insertion port, and detects that an object other than the card has been inserted when a movement distance of the insert in a period in which the magnetism is undetected by the magnetic detector is a predetermined value or more.

19 Claims, 12 Drawing Sheets

CARD READER AND FOREIGN MATTER DETECTION METHOD

CROSS REFERENCE TO RELATED APPLICATION

The present application claims priority under 35 U.S.C. § 119 to Japanese Application No. 2018-115613 filed Jun. 18, 2018, the entire content of which is incorporated herein by reference.

FIELD OF THE INVENTION

At least an embodiment of the present invention relates to a card reader for reading data recorded on a card or recording data onto the card. Further, at least an embodiment of the present invention relates to a foreign matter detection method for such a card reader.

BACKGROUND

Card readers for reading magnetic data recorded on a card and recording magnetic data onto the card have been used widely. In industries such as financial institutions where card readers are used, so-called skimming in which the magnetic data of a card is illegally acquired using a magnetic head by a criminal attaching the magnetic head to a card insertion part of a card reader has become a large problem. The tricks used for skimming by criminals become more sophisticated year by year, and the situation in which a device for skimming such as a magnetic head for skimming (hereinafter, referred to as an "insert skimmer") for reading the magnetic data of the card is attached on the inside of a card reader has been occurring. JP-A-2017-174164 discloses a technique for detecting that an insert skimmer has been inserted on the inside of a card reader.

The technique for detecting the insertion of an insert skimmer is not limited to that disclosed in JP-A-2017-174164, and it is advantageous for the prevention of crime to be able to combine and carry out a plurality of techniques.

At least an embodiment of the present invention, in consideration of the aforementioned situation, provides a card reader which can detect that a foreign matter such as an insert skimmer having a specific shape has been inserted on the inside of a card reader by a method which is different from that of JP-A-2017-174164 and a foreign matter detection method.

SUMMARY

The card reader of at least an embodiment of the present invention includes a magnetic detector structured to detect magnetism from a card inserted into an insertion port, a main body part including a card conveyance path in which the card inserted from the insertion port is conveyed, and a card detection sensor disposed in the main body part and structured to detect a tip end of the card in an insertion direction of the card, wherein the magnetic detector and the card detection sensor are disposed at a distance less than a length of the card in the insertion direction, the card reader further including a control unit structured to start monitoring of the magnetism detected by the magnetic detector when the card detection sensor detects a tip end of an insert inserted into the insertion port, and detect that an object other than the card has been inserted when a movement distance of the insert in a period in which the magnetism is undetected by the magnetic detector is a predetermined value or more.

A foreign matter detection method for a card reader of at least an embodiment of the present invention includes a magnetic detector structured to detect magnetism from a card inserted into an insertion port, a main body part including a card conveyance path in which the card inserted from the insertion port is conveyed, and a card detection sensor disposed in the main body part and structured to detect a tip end of the card in an insertion direction of the card, wherein the magnetic detector and the card detection sensor are disposed at a distance less than a length of the card in the insertion direction, the foreign matter detection method including starting monitoring of the magnetism detected by the magnetic detector when the card detection sensor detects a tip end of an insert inserted into the insertion port, and detecting that an object other than the card has been inserted when the conveyance distance of the insert in a period in which the magnetism is undetected by the magnetic detector is a predetermined value or more.

At least an embodiment of the present invention can provide the card reader which can detect that a foreign matter such as an insert skimmer having a specific shape has been inserted on the inside of a card reader, and the foreign matter detection method.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION (Configuration of Card Reader)

Figure 1:
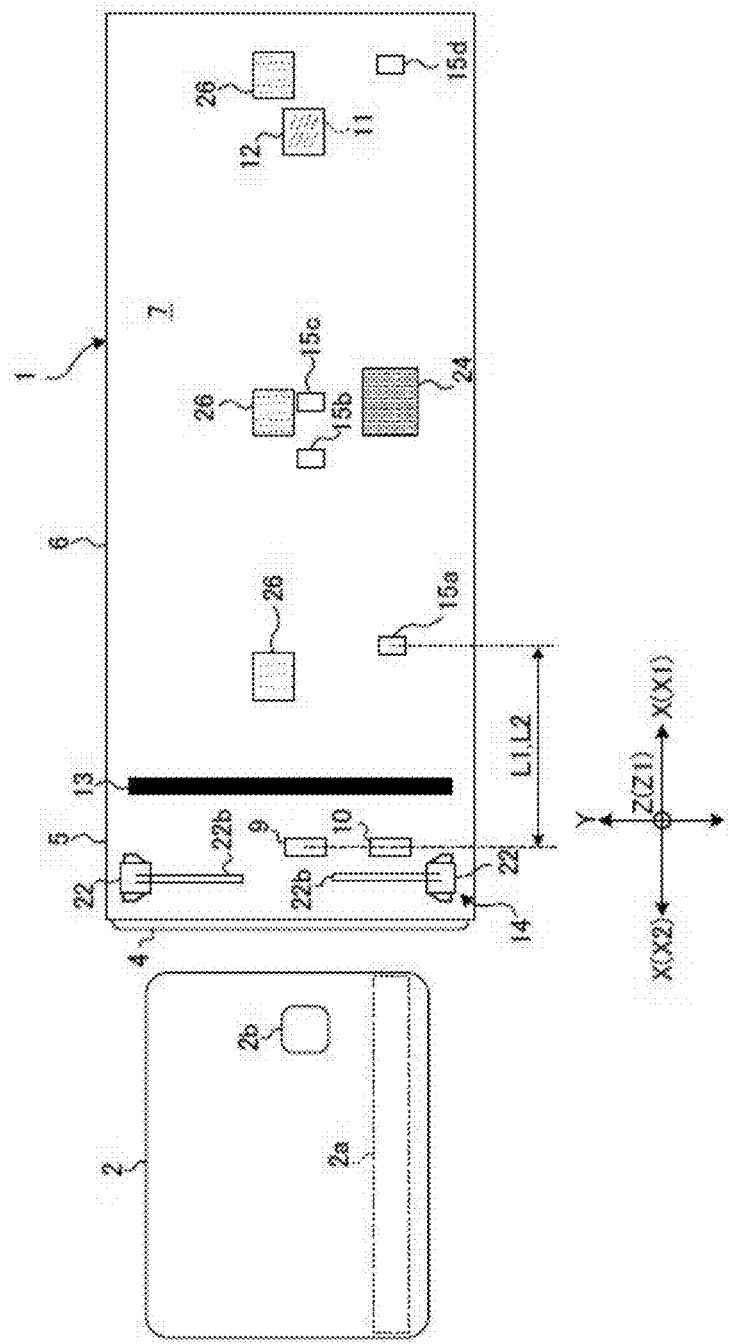
FIG. 1 is a plan view describing the configuration of a card reader 1 according to an embodiment of the card reader of the present invention.
Figure 2:
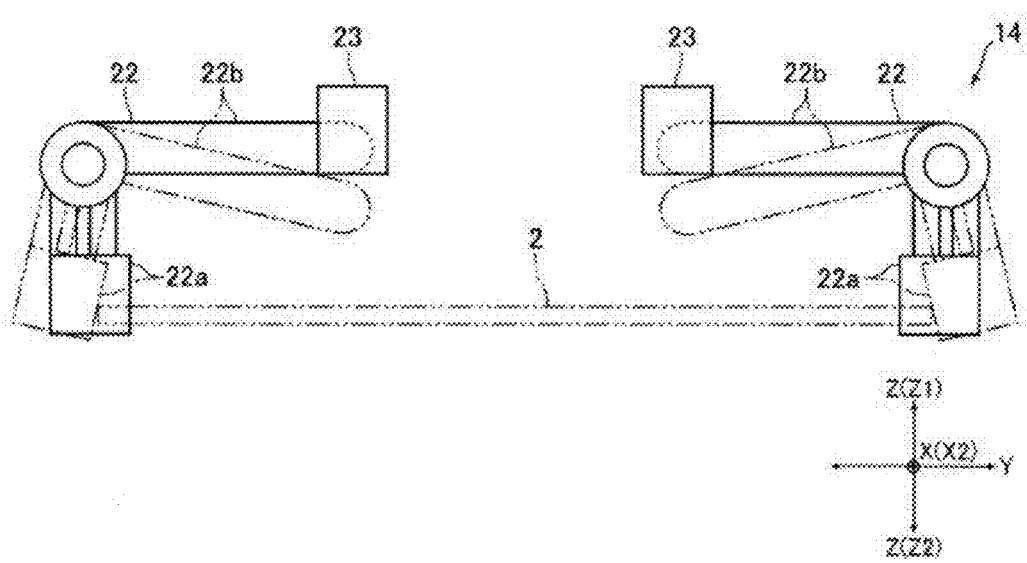
FIG. 2 is a front view describing the configuration of a card insertion detection mechanism 14 shown in FIG. 1.
Figure 3:
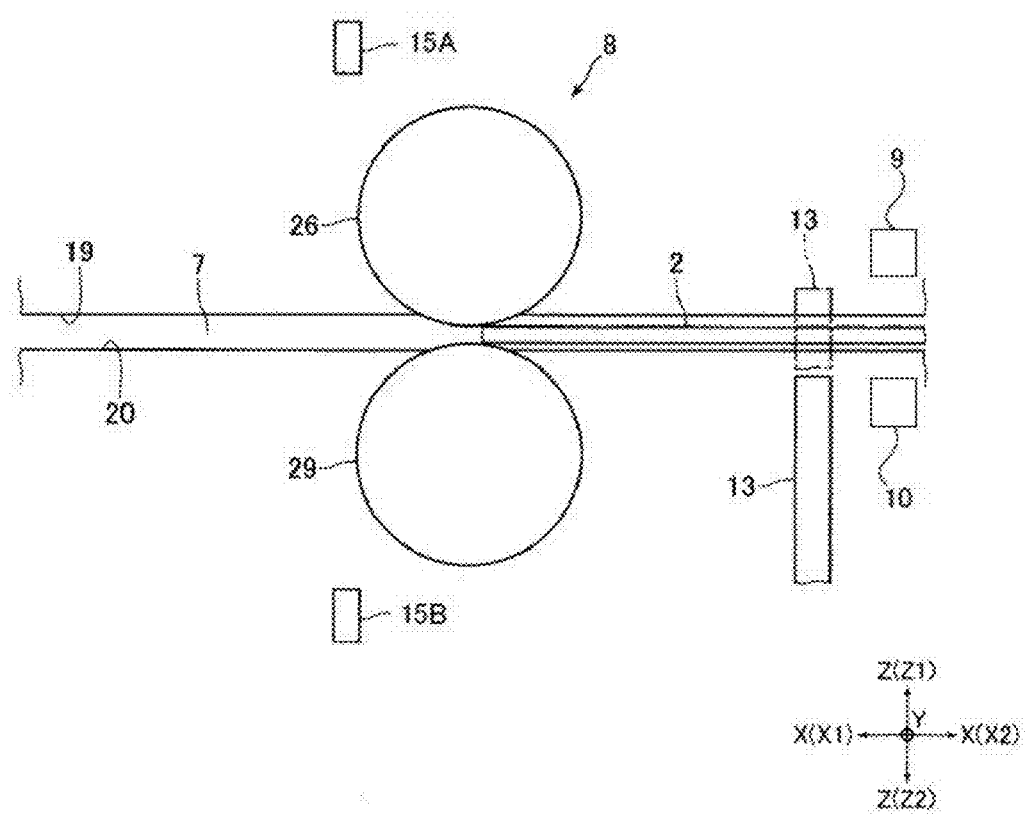
FIG. 3 is a side view for describing the configuration of a prehead 10, an IC chip sensor 9, a card detection mechanism 15a and a conveyance roller 26 shown in FIG. 1.
Figure 4:
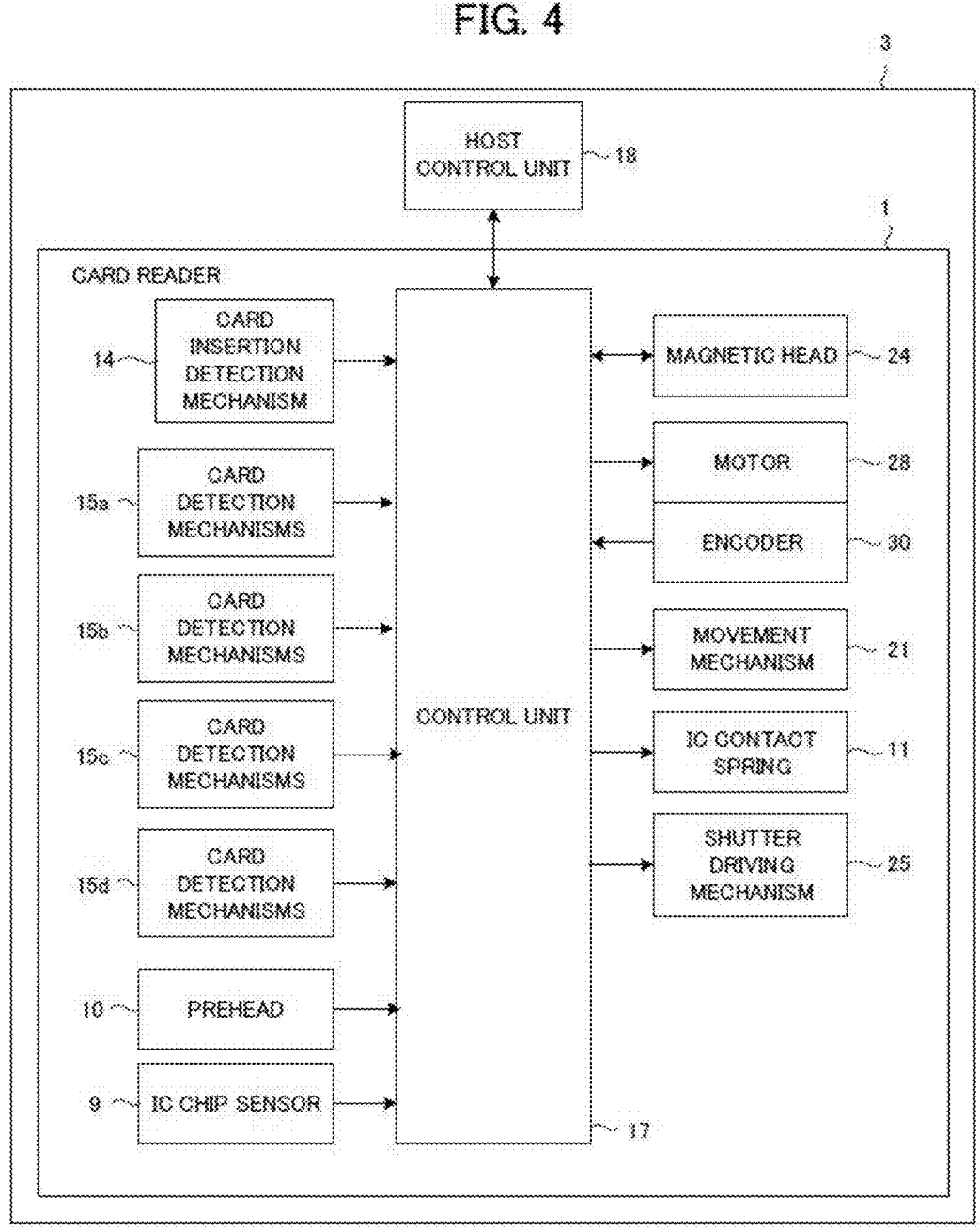
FIG. 4 is a block diagram of a host device 3 on which the card reader 1 shown in FIG. 1 is mounted and the card reader 1.

FIG. 1 is a plan view describing the configuration of a card reader 1 according to an embodiment of the card reader of the present invention. FIG. 2 is a front view describing the configuration of a card insertion detection mechanism 14 shown in FIG. 1. FIG. 3 is a side view describing the configuration of the prehead 10, the IC chip sensor 9, the card detection mechanism 15a and the conveyance roller 26 shown in FIG. 1. FIG. 4 is a block diagram of a host device 3 on which the card reader 1 shown in FIG. 1 is mounted and the card reader 1.

The card reader 1 is a device for reading data recorded on a card 2 and recording data into the card 2, and is used by mounting on a host device 3 (refer to FIG. 4) such as an Automated Teller Machine (ATM). As shown in FIG. 1, the card reader 1 includes a card insertion unit 5 in which an insertion port 4 for inserting a card 2 is formed, and a main body part 6. A card conveyance path 7 in which the card 2 which is inserted into the insertion port 4 is conveyed is formed on the inside of the main body part 6 of the card reader 1, and the card reader 1 includes a card conveyance mechanism 8 (Refer to FIG. 3) which conveys the card 2 on the card conveyance path 7.

The card reader 1 conveys the card 2 in the X direction shown in FIG. 1 and the like. Further, the card 2 is inserted in the X1 direction and ejected in the X2 direction of FIG. 1 and the like. Namely, the X1 direction is the insertion direction of the card 2 into the insertion port 4, and the X2 direction is the ejection direction of the card 2 from the injection port 4. Further, the Z direction in FIG. 1 and the like, which is orthogonal to the X direction is the thickness direction of the card 2 inserted in the insertion port 4, and the Y direction in FIG. 1 and the like, which is orthogonal to the X direction and the Z direction is the width direction of the card 2. In the following description, the X direction is the front and rear direction, the Y direction is the right and left direction, and the Z direction is the vertical direction. Further, the side (X2 direction side) on which the insertion port 4 is formed in the front and rear direction is a "front" side, and the opposite side (X1 direction side) is a "rear (back)" side. Further, one side (Z1 direction side) in the vertical direction is an "upper" side, and the opposite side (Z2 direction side) is a "lower" side.

The card 2 is, for example, a rectangular-shaped card made of vinyl chloride and having a thickness in the range of 0.7 mm to 0.8 mm. Further, the card 2 is a contact type IC card with a magnetic stripe as prescribed by International Standard (ISO/IEC7811) or Japanese Industrial Standards JIS (JISX6302). As shown in FIG. 1, a magnetic stripe in which magnetic data is to be recorded is formed on the back face (bottom surface) of the card 2. Further, an IC chip may be incorporated in the card 2, and an external connection terminal 2b of the IC chip is formed on the front side (upper side) of the card 2. The magnetic stripe 2a and the external connection terminal 2b are formed in a predetermined position prescribed by the international standards or JIS standards.

The card reader 1 comprises a magnetic head 24 for performing at least one of reading magnetic data recorded on a magnetic stripe 2a or recording magnetic data onto the magnetic stripe 2a (refer to FIG. 1), and an IC contact block 12 having a plurality of IC contact springs 11 in contact with the external connection terminal 2b of the card 2 on the inside of the main body part 6.

Further, the card reader 1 comprises a shutter member 13 for closing the card conveyance path 7, a card insertion detection mechanism 14 for detecting that a card 2 has been inserted in the insertion port 4, a prehead 10, an IC chip sensor 9, card detection mechanisms 15a, 15b, 15c and 15d for detecting the presence of a card 2 in the card conveyance path 7 and a control unit 17 for controlling the card reader 1. The control unit 17 is connected to a host control unit 18 which is the control unit of the host device 3 (refer to FIG. 4).

The card insertion unit 5 is connected to the front end of the main body part 6. The card conveyance path 7, as shown in FIG. 3, includes an upper guide member 19 constituting the upper surface of the card conveyance path 7 and a lower guide member 20 constituting the lower surface of the card conveyance path 7. The upper guide member 19 and the lower guide member 20 are made of an insulating resin material. As shown in FIG. 1, the magnetic head 24 and the IC contact block 12 are disposed on the inside of the main body part 6. The magnetic head 24 is disposed so that a gap part of the magnetic head 24 faces the card conveyance path 7 from the lower side. The IC contact block 12 is disposed on the rear side relative to the magnetic head 24. Further, the IC contact block 12 is disposed so as to face the card conveyance path 7 from the upper side. The magnetic head 24 is electrically connected to the control unit 17 (refer to FIG. 4). Note that, the IC contact block 12 may be configured to be disposed in front of the magnetic head 24 (for example, between the second conveyance roller 26 and the first conveyance roller 26 counting from the side closer to shutter member 13).

The movement mechanism 21 (refer to FIG. 4) which moves the IC contact block 12 between a contactable position in which the IC contact spring 11 can be in contact with the external connection terminal 2b of the card 2 and a retreated position retreated (specifically, retreating to the upper side) so that the IC contact spring 11 is not in contact with the external connection terminal 2b of the card 2 is connected to the IC contact block 12. The movement mechanism 21 includes a drive source such as a solenoid, and a power transmission mechanism such as a link mechanism for transmitting the power of the drive source to the IC contact block 12. The movement mechanism 21 is connected to the control unit 17. Specifically, the drive source of the movement mechanism 21 is electrically connected to the control unit 17. The IC contact spring 11 is electrically connected to the control unit 17. The control unit 17 supplies current to the IC contact spring 11. Examples of the movement mechanism 21 include the configuration described in WO 2018/61685, the configuration described in WO 2016/158946, or the configuration which moves using a cam groove.

The card insertion detection mechanism 14 is disposed on the rear side of the insertion port 4, and detects the card 2 inserted in the insertion port 4. The card insertion detection mechanism 14 is a width detection mechanism for detecting that the card 2 is inserted into the insertion port 4 by detecting the width (width in the right and left direction) of the card 2 inserted in the insertion port 4. As shown in FIG. 2, this card insertion detection mechanism 14 includes two lever members 22 respectively disposed on both sides in the right and left direction and two sensors 23. The card insertion detection mechanism 14 is disposed in a front end side portion of the card insertion unit 5. Further, the card insertion detection mechanism 14 is electrically connected to the control unit 17. Specifically, the two sensors 23 are electrically connected to the control unit 17. The sensor 23 is a transmission type optical sensor having a light emitting element and a light receiving element disposed so as to face each other. The sensor 23 is disposed on the upper side of the card conveyance path 7 so that the light emitting unit and the light receiving unit face each other in the front and rear direction. Note that, in FIG. 1, the illustration of the sensors 23 has been omitted.

The lever member 22 is formed so that the shape as viewed from the front and rear direction is substantially L-shaped, and is constituted from card contact parts 22a respectively disposed on both end sides of the card conveyance path 7 in the right and left direction, and a light intercepting parts 22b extending from the upper end of the card contact part 22a to the inside in the right and left direction. This lever member 22 is rotatably held by a frame of the card insertion unit 5, so as to make it possible to have a center of rotation at the boundary between the card contact part 22a and the light intercepting parts 22b and rotation in the front and rear direction as the axis of rotation. The light intercepting parts 22b are disposed on the upper side of the card conveyance path 7. Further, the lever member 22 is biased by a spring member which is not shown so that the lower end side of the card contact part 22a is disposed in the card conveyance path 7.

During the standby mode prior to the card 2 being inserted into the insertion port 4, as shown by the solid line of FIG. 2, the lower end side of the card contact part 22a is disposed in the card conveyance path 7, and the two respective light intercepting parts 22b intercept between the light emitting unit of sensor 23 and the light receiving unit. At this time, the card insertion detection mechanism 14 is in an OFF state. In this state, when the card 2 in which the width of the short-side direction is a predetermined width is inserted in the insertion port 4, as shown by the two-dot chain line of FIG. 2, both the left and right ends of the card 2 contact with the lower end side of the two respective card contact parts 22a to rotate the two lever members 22 until the two respective light intercepting parts 22b are separated from the light emitting unit of the sensor 23 and the light receiving unit. If the two respective light intercepting parts 22b are separated from the light emitting unit of the two sensors 23 and the light receiving unit, the card insertion detection mechanism 14 is in the ON state.

On the one hand, the width of the card 2 inserted in the insertion port 4 is narrower than the predetermined width, thus, when the light intercepting parts 22b are not separated from between the light emitting unit of sensor 23 of at least one of the two sensors 23 and the light receiving unit, the card insertion detection mechanism 14 remains in the OFF state. Therefore, the card insertion detection mechanism 14 detects a card 2 by switching from an OFF state to an ON state when the width in the right and left direction of the card 2 inserted in the insertion port 4 is a predetermined width. Note that, during the standby mode prior to the card 2 being inserted into the insertion port 4, by separating the two respective light intercepting parts 22b between the light emitting unit of the sensor 23 and the light receiving unit, the card insertion detection mechanism 14 may be in an OFF state. In this case, when a card 2 having a predetermined width is inserted in the insertion port 4, and the space between the light emitting unit of the sensor 23 and the light receiving unit is intercepted by the two respective light intercepting parts 22b, the card insertion detection mechanism 14 is in the ON state. The configuration of the card insertion detection mechanism 14 is not limited to that shown in FIG. 2. For example, the card contact part 22a may be disposed to only one side in the width direction of the card, and the other side may be a side surface of the conveyance path of the card. In this case, by setting the distance between the card contact part 22a and the side surface of the conveyance path of the card to a predetermined width (slightly narrower than the width of the card), the insertion will be detected when the card is inserted.

The shutter member 13 is disposed in the boundary portion between the card insertion unit 5 and the main body part 6, in other words, the rear end side of the card insertion unit 5. The shutter driving mechanism 25 (refer to FIG. 4) is connected to the shutter member 13. The shutter driving mechanism 25 includes a drive source such as a solenoid, and a power transmission mechanism such as a link mechanism for transmitting the power of the drive source to the shutter member 13.

The shutter driving mechanism 25 is connected to the control unit 17. Specifically, the drive source of the shutter driving mechanism 25 is electrically connected to the control unit 17.

The shutter member 13 is capable of moving between a closed position (position illustrated by the two-dot chain line of FIG. 3) which closes the card conveyance path 7 and an open position (position illustrated by the solid line of FIG. 3) which retreats from the card conveyance path 7 to open the card conveyance path 7.

The prehead 10 is a magnetic head for detecting whether or not the desired magnetic data determined in accordance with the standards has been recorded on the magnetic stripe 2a of the card 2 inserted from the insertion port 4. The prehead 10 is disposed between the card insertion detection mechanism 14 and the shutter member 13 in the card insertion unit 5, and detects magnetism from the position where the magnetic stripe 2a of the card 2 inserted in the insertion port 4 is to be formed. The prehead 10 functions as a magnetic detector. The prehead 10 is disposed in the right and left direction in almost the same position as the magnetic head 24 in the main body part 6. As shown in FIG. 3, the prehead 10 is disposed so that the gap part of the prehead 10 faces to the card 2 inserted in the insertion port 4 from the lower side. As shown in FIG. 1, the distance L1 in the front and rear direction between the prehead 10 and the card detection mechanism 15a is less than the length of the front and rear direction of the legitimate card 2 that card reader 1 is to read.

The IC chip sensor 9 is a sensor for detecting whether or not an IC chip has been mounted on the card 2 inserted from the insertion port 4. Specifically, the IC chip sensor 9 is a metal sensor for detecting the metal contained on the external connection terminal 2b of the card 2 inserted from the insertion port 4. The IC chip sensor 9 is disposed in the card insertion unit 5 between the card insertion detection mechanism 14 and the shutter member 13, and detects the metal from the position where the external connection terminal 2b of the card 2 inserted in the insertion port 4 is to be formed. The IC chip sensor 9 functions as a metal detector. The IC chip sensor 9 is in the same position as the prehead 10 in the front and rear direction, and is disposed in the right and left direction in almost the same position as the IC contact block 12 in the main body part 6. As shown in FIG. 3, the IC chip sensor 9 is disposed so as to face the card inserted in the insertion port 4 from the upper side. The distance L2 of the front and rear direction between the IC chip sensor 9 and the card detection mechanism 15a becomes the same as the aforementioned distance L1. Note that, the distance L2 does not have to be the same as the distance L1. The lower limit of the distance L2 is made to a value greater than the distance from the end part of the rear side of the front and rear direction of the card 2 to the end part of the front side of the front and rear direction of the external connection terminal 2b.

The card detection mechanisms 15a, 15b, 15c and 15d are disposed on the inside of the main body part 6. Namely, the card detection mechanisms 15a, 15b, 15c and 15d are disposed on the rear side relative to the card insertion detection mechanism 14, the prehead 10 and the IC chip sensor 9. Further, the card detection mechanisms 15a, 15b, 15c and 15d are respectively disposed in a state shifted in the front and rear direction. The card detection mechanism 15b is disposed on the rear side relative to the card detection mechanism 15a, the card detection mechanism 15c is disposed on the rear side relative to the card detection mechanism 15b, and the card detection mechanism 15d is disposed on the rear side relative to the card detection mechanism 15c. As shown in FIG. 4, the card detection mechanisms 15a, 15b, 15c and 15d are electrically connected to the control unit 17. Further, as shown in FIG. 3, the card detection mechanisms 15a, 15b, 15c and 15d are transmission type optical sensors each having a light emitting unit 15A and a light receiving unit 15B disposed facing each other. Note that, in FIG. 3, an illustration of the card detection mechanisms 15b, 15c and 15d has been omitted. As shown in FIG. 3, the light emitting unit 15A and the light receiving unit 15B are disposed in a state in which the card conveyance path 7 is sandwiched in the vertical direction. When there is no card 2 between the light emitting unit 15A and the light receiving unit 15B, the light receiving unit 15B receives light from the light emitting unit 15A. At this time, the card detection mechanisms 15a, 15b, 15c and 15d are in an OFF state. In this state, if a card 2 enters between the light emitting unit 15A and the light receiving unit 15B, the light from the light emitting unit 15A to the light receiving unit 15B is intercepted so that the card detection mechanisms 15a, 15b, 15c and 15d are in the ON state. Therefore, the card detection mechanisms 15a, 15b, 15c and 15d detect the card 2 by switching from an OFF state to an ON state. Among the card detection mechanisms 15a, 15b, 15c and 15d, the card detection mechanism 15a is disposed closest to the front side in the main body part 6, and constitutes the card detection sensor for detecting the tip end (tip end of direction X1) in the front and rear direction of the card 2 inserted in the insertion port 4.

Note that, the card detection mechanisms 15a, 15b, 15c and 15d may be reflection type optical sensors. In this case, when the light receiving unit does not receive light from the light emitting units of the card detection mechanisms 15a, 15b, 15c and 15d, the card detection mechanisms 15a, 15b, 15c and 15d are in the OFF state, thus, if the light receiving unit receives light emitted from the light emitting units of the card detection mechanisms 15a, 15b, 15c and 15d and reflected from the card 2, the card detection mechanisms 15a, 15b, 15c and 15d are in the ON state.

As shown in FIG. 3, the card conveyance mechanism 8 includes three conveyance rollers 26 (refer to FIG. 1. In FIG. 3, only the most front side of the rollers is illustrated) in contact with the card 2 to convey the card 2 on the card conveyance path 7, a motor 28 (refer to FIG. 4) for driving each conveyance roller 26, and a power transmission mechanism (not shown) for transmitting the power of the motor 28 to each conveyance roller. Each conveyance roller 26 is disposed on the inside of the main body part 6. Namely, the conveyance rollers 26 are disposed to the rear side relative to the card insertion detection mechanism 14.

As shown in FIG. 3, a pad roller 29 is disposed to oppose each conveyance roller 26. Each conveyance roller 26 and the pad roller 29 are opposed in the vertical direction. Further, the pad roller 29 is biased toward the conveyance roller 26, and the card 2 is conveyed in a state sandwiched between the conveyance roller 26 and the pad roller 29.

An encoder 30 for detecting the rotation of the motor 28 is attached to the motor 28 (refer to FIG. 4). In the present embodiment, it is possible to make the conveyance roller 26 rotate even in a state when the motor 28 is stopped, and if the conveyance roller 26 is rotated in the state when the motor 28 is stopped, the rotation of the motor 28 is detected by the encoder 30. Namely, if the conveyance roller 26 rotates in the state in which the motor 28 is stopped, the rotation of the conveyance roller 26 is detected by the encoder 30. The motor 28 and the encoder 30 are electrically connected to the control unit 17.

(Configuration Example of Assumed Insert Skimmer)

Figure 5A:
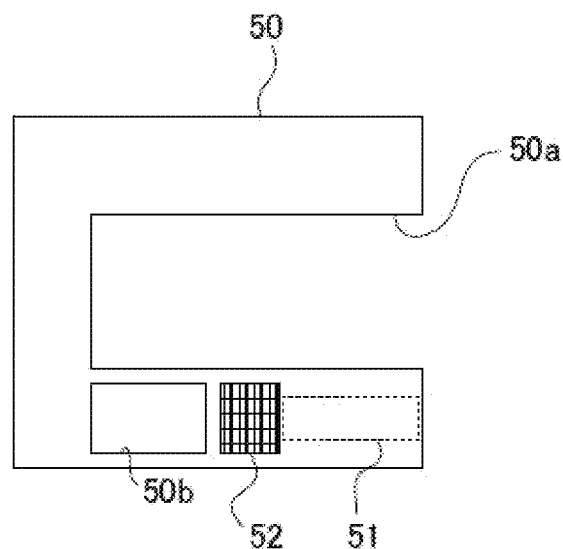
FIG. 5A is a diagram illustrating a first configuration example of an insert skimmer assumed to be inserted on the inside of the card reader, and 5B is a diagram illustrating a second configuration example of the insert skimmer assumed to be inserted on the inside of the card reader 1.
Figure 5B:
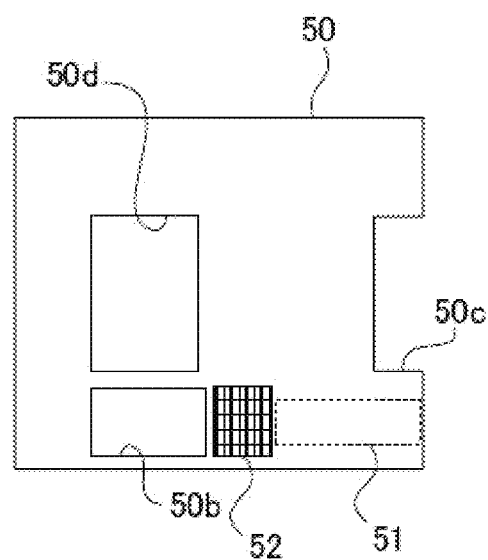
Figure 6:
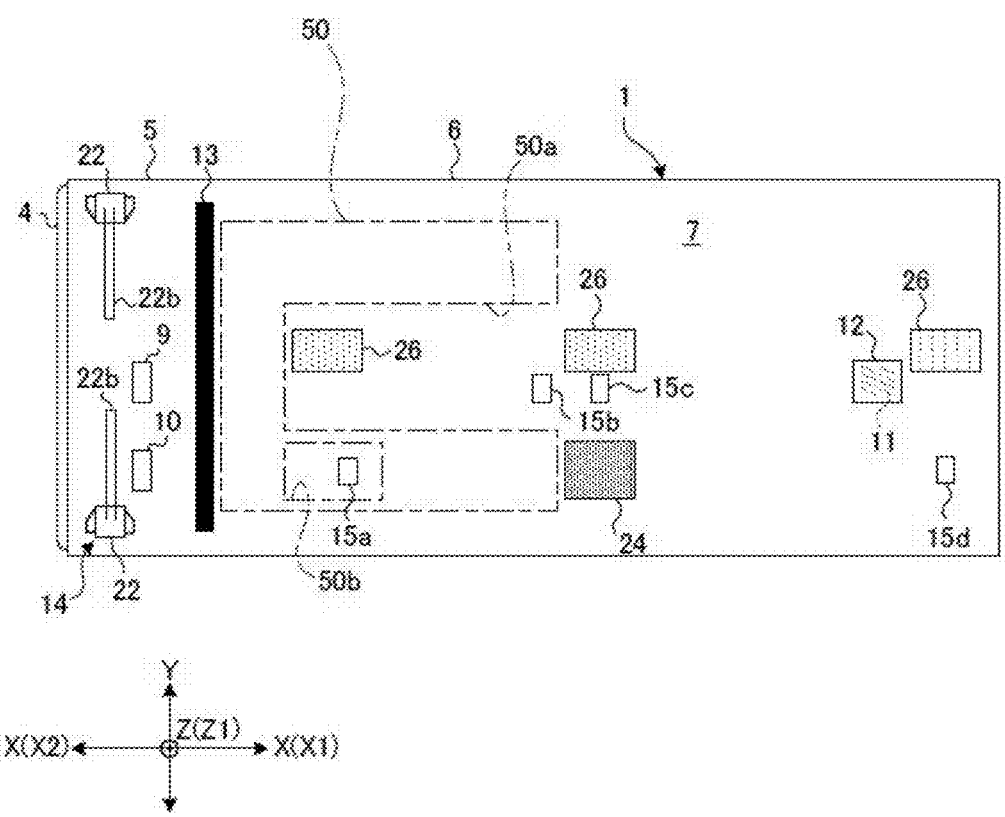
FIG. 6 is a plan view illustrating a state in which the insert skimmer 50 shown in FIG. 5A is inserted in a main body part 6 of the card reader 1.

FIG. 5A is a diagram illustrating a first configuration example of the insert skimmer assumed to be inserted on the inside of the card reader 1. FIG. 5B is a diagram illustrating a second configuration example of the insert skimmer assumed to be inserted on the inside of the card reader 1. FIG. 6 is a plan view illustrating a state in which the insert skimmer 50 shown in FIG. 5A is inserted in the main body part 6 of the card reader 1.

The insert skimmer 50 shown in FIG. 5A and FIG. 5B includes a main body part formed by a rectangular plate-shaped electrically-conductive material in which the width in the right and left direction is substantially the same as the width of the card 2. Specifically, the main body part of the insert skimmer 50 is made of metal. A cutout part 50a or an aperture 50d for avoiding contacting with the conveyance roller 26 which is closest to the front side in the main body part 6 of the card reader 1 is formed in the main body part 6 of the insert skimmer 50 shown in FIG. 5A and FIG. 5B. Further, a through hole 50b is formed in the main body part of the insert skimmer 50 shown in FIG. 5A and FIG. 5B so as to not block light from the light emitting unit 15A of the card detection mechanism 15a toward the light receiving unit 15B when the insert skimmer 50 is attached to the main body part 6 of the card reader 1. Further, the cutout part 50c is formed in the main body part of the insert skimmer 50 shown in FIG. 5B so as to not block the light from the light emitting unit 15A of the card detection mechanism 15b toward the light receiving unit 15B when the insert skimmer 50 is attached to the main body part 6 of the card reader 1. The insert skimmer 50 shown in FIG. 5A is inserted in the main body part 6 by pushing manually because the cutout part 50a is large and the area of the main body part which can contact with the conveyance roller 26 is small. Because the insert skimmer 50 shown in FIG. 5B has a large area of the main body part which can contact with the conveyance roller 26, it is inserted in the main body part 6 by conveying with the conveyance roller 26 when the insert skimmer 50 is inserted into the insertion port 4.

A counterfeit magnetic stripe 51 is formed in the end part (tip end) of the rear side in the front and rear direction of the main body part of the insert skimmer 50 shown in FIGS. 5A and 5B, and the magnetic head 52 for reading the magnetic information from the magnetic stripe of the legitimate card 2 is formed to the left of this magnetic stripe 51. The information recorded on the magnetic stripe 51 is the same as the information recorded on the tip end of the magnetic stripe 2a of the legitimate card 2. The through hole 50b and the magnetic head 52 must be formed in the same position as the magnetic stripe 51 in the right and left direction in the main body part of the insert skimmer 50, thus, the length in the front and rear direction of the magnetic stripe 51 becomes sufficiently smaller than the length in the front and rear direction of the magnetic stripe 2a of the legitimate card 2. Note that, it is assumed that the position of the magnetic head 52 is, for example, on the left side of the through hole 50b. Further, it is assumed that the width in the front and rear direction of the through hole 50b is somewhat large somewhat large in order to definitely avoid the card detection mechanism 15a.

The control unit 17 of the card reader 1 shown in FIG. 4 performs overall control of the entirety of the card reader 1, and specifically, contains various processors which execute programs and perform processes, a Random Access Memory (RAM), and a Read Only Memory (ROM). The various processors include a central processing unit (CPU) which is a general-purpose processor functioning as various processing units by executing a program, a programmable logic device (PLD) which is a processor capable of changing a circuit configuration after a field-programmable gate array (FPGA) is manufactured, and a dedicated electric circuit which is a processor having a dedicated circuit configuration designed for performing a specific process such as an Application-Specific Integrated Circuit (ASIC). More specifically, the configuration of each of the various processors is an electrical circuit in which circuit elements, such as semiconductor elements, are combined. The control unit 17 may be configured by one of these various processors, or may be configured by a combination of two or more same or different processors (for example, a combination of a plurality of the FPGAs or the CPU and the FPGA).

The control unit 17 operates the prehead 10 and the IC chip sensor 9 when the legitimate card 2 is inserted in the insertion port 4 and the insertion of the card 2 is detected by the card insertion detection mechanism 14. Moreover, when the prehead 10 successfully reads the desired information from the tip end of the magnetic stripe 2a of the card 2, or, the IC chip sensor 9 detected the IC chip (metal), the control unit 17 moves the shutter member 13 from the closed position to the open position. Therefore, the card 2 can be incorporated into the main body part 6.

Figure 7:
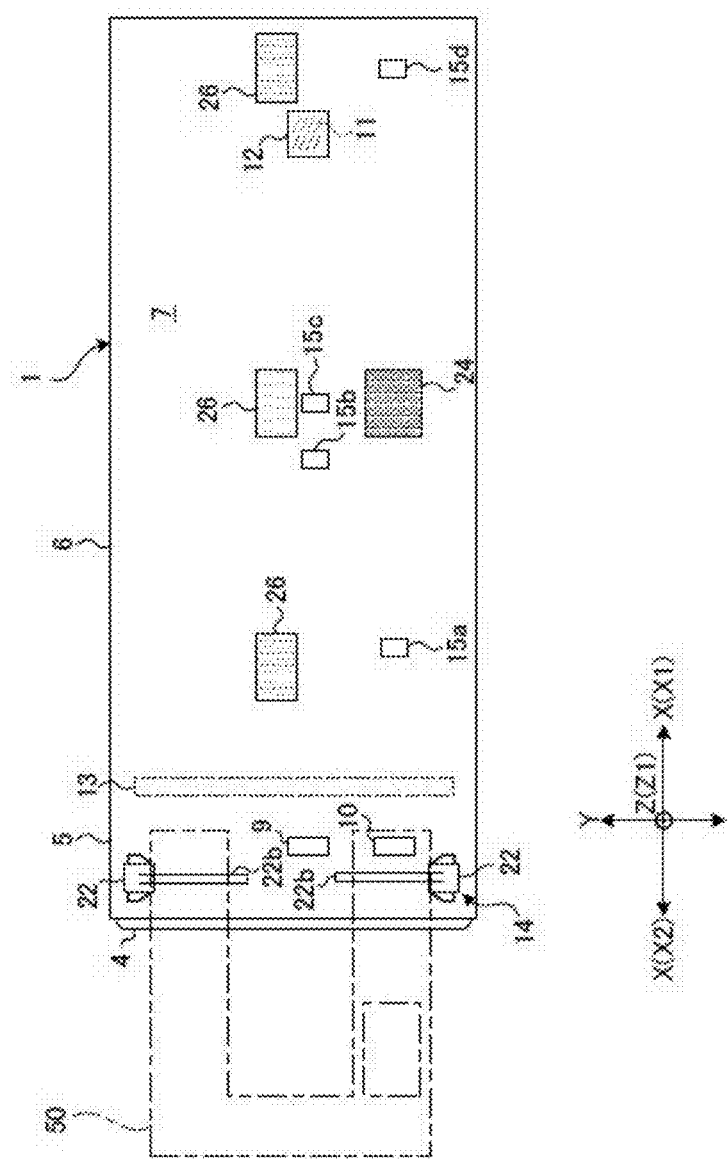
FIG. 7 is a diagram illustrating a state in which the insert (insert skimmer 50 or card 2) is inserted in an insertion port 4 and a shutter member 13 is in the open position.

Further, the control unit 17 operates the prehead 10 and the IC chip sensor 9 when the insert skimmer 50 having the magnetic stripe 51 shown in FIGS. 5A and 5B is inserted in the insertion port 4 and the insertion of the insert skimmer 50 is detected by the card insertion detection mechanism 14. Moreover, if the prehead 10 successfully reads the desired information from the magnetic stripe 51 of the insert skimmer 50 and the IC chip sensor 9 detected the metal of the main body part of the insert skimmer 50, the control unit 17 moves the shutter member 13 from the closed position to the open position. Therefore, as shown in FIG. 7, the insert skimmer 50 can be inserted on the inside of the main body part 6. In FIG. 7, the shutter member 13 is indicated by a broken line which indicates that it is in the open position.

The control unit 17 performs a first detection process and a second detection process as the processes for detecting that the insert is an insert skimmer 50 such as that shown in FIGS. 5A and 5B after the state shown in FIG. 7.

Specifically, if the insert (insert skimmer 50 or card 2) from the state of FIG. 7 is pushed in the card conveyance path 7, and the tip end of the insert (insert skimmer 50 or card 2) is detected by the card detection mechanism 15a at the most front side, the control unit 17 starts the first detection process or the second detection process. Whether the control unit 17 performs the first detection process or the second detection process can be set by, for example, the host device 3.

(First Detection Process of Insert Skimmer)

Figure 8:
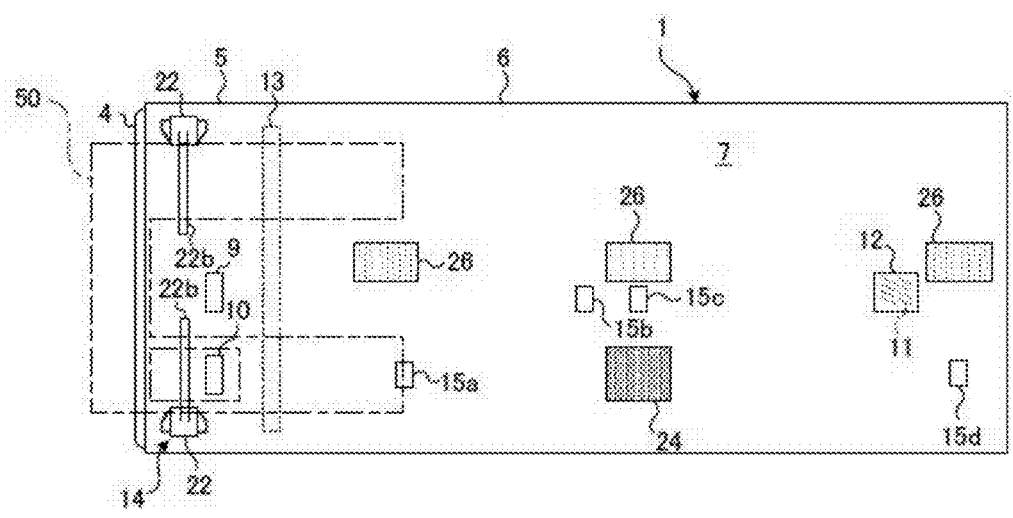
FIG. 8 is a diagram illustrating a state in which the insert (insert skimmer 50 or card 2) from the state of FIG. 7 is further pushed to the rear side in the front and rear direction.

FIG. 8 is a diagram illustrating a state in which the insert (insert skimmer 50 or card 2) from the state of FIG. 7 is further pushed to the rear side in the front and rear direction. When a card-shaped insert (insert skimmer 50 or card 2) as shown in FIG. 8 is pushed and the tip end of the insert (insert skimmer 50 or card 2) is detected by the card detection mechanism 15a, the control unit 17 starts the monitoring of the magnetism detected by the prehead 10. Moreover, the control unit 17 detects that an object other than the legitimate card 2 (namely, the insert skimmer 50) has been inserted, when the state in which the magnetism is undetected by the prehead 10 continues, and the movement distance of the insert (insert skimmer 50 or card 2) during the period in which the state where the magnetism is undetected continues is a predetermined value or more.

In the case when the insert is the card 2, at the time that the tip end of the card 2 is detected by the card detection mechanism 15a, the prehead 10 is positioned under the magnetic stripe 2a of the card 2. Therefore, from this time point, the prehead 10 continuously detects the magnetism until the card 2 moves in the X1 direction and the card insertion detection mechanism 14 is in the OFF state.

On the one hand, in the case when the insert is the insert skimmer 50, at the time that the tip end of the insert skimmer 50 is detected by the card detection mechanism 15a, as shown in FIG. 8, the prehead 10 is positioned under the through hole 50b of the insert skimmer 50. Therefore, from this time point, the magnetism is not detected by the prehead 10 until the insert skimmer 50 moves in the X1 direction and the card insertion detection mechanism 14 is in the OFF state. The control unit 17 can determine that the insert is the insert skimmer 50 when the movement distance of the insert in the period from the aforementioned time point in which the magnetism is not detected by the prehead 10 is obtained from the output of the encoder 30 which detects the rotation of the motor 28 for driving the conveyance roller 26, and the movement distance is a predetermined value or more.

(Second Detection Process of Insert Skimmer)

The control unit 17 starts the monitoring of the output signal of the IC chip sensor 9 when the insert (insert skimmer 50 or card 2) is pushed as shown in FIG. 8 and the tip end of the insert (insert skimmer 50 or card 2) is detected by the card detection mechanism 15a. Moreover, the control unit 17 determines that the insert is the insert skimmer 50 and detects that the object other than the legitimate card 2 (namely, the insert skimmer 50) has been inserted when the metal is detected by the IC chip sensor 9.

In the case when the insert is the card 2, the external connection terminal 2b is in a state which already passed under the IC chip sensor 9 at the time that the tip end of the card 2 is detected by the card detection mechanism 15a. Therefore, from this time, the detection of the metal is not performed by the IC chip sensor 9 until the card 2 moves in the X1 direction and the incorporation of the card 2 is terminated.

Figure 9:
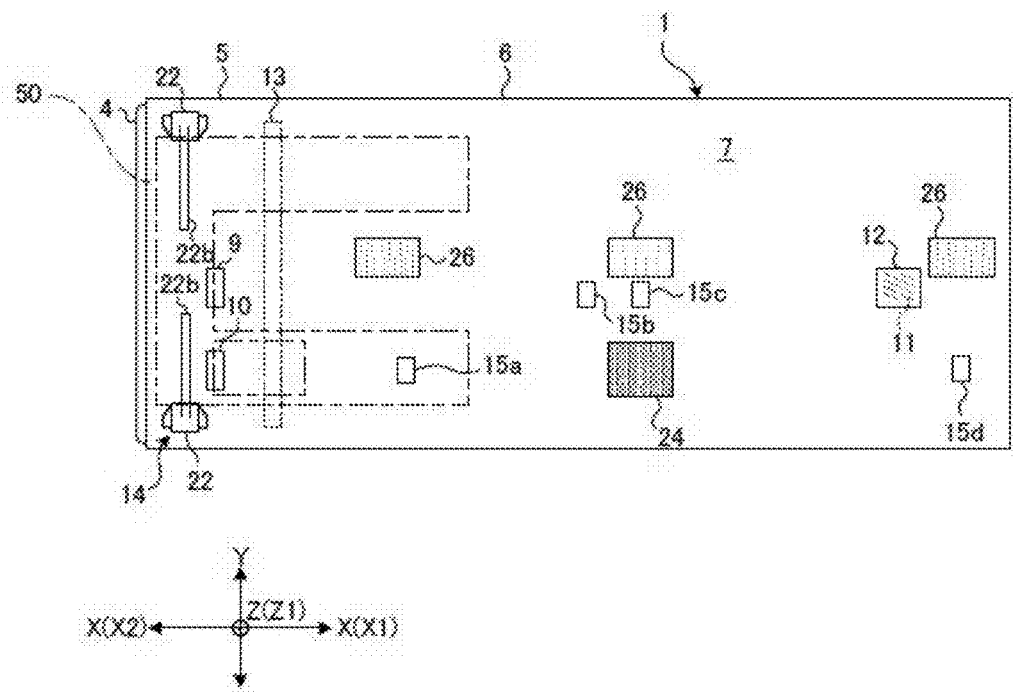
FIG. 9 is a diagram illustrating a state in which the insert (insert skimmer 50 or card 2) from the state of FIG. 8 is moved to the rear side in the front and rear direction.

On the one hand, in the case when the insert is the insert skimmer 50, at the time that the tip end of the insert skimmer 50 is detected by the card detection mechanism 15a, the rear end of the main body part of the insert skimmer 50 is positioned on the front side of the IC chip sensor 9 as shown in FIG. 8. Therefore, from this time point, if the insert skimmer 50 moves in the X1 direction, and, as shown in FIG. 9, the main body part of the insert skimmer 50 is under the IC chip sensor 9, the metal is detected by the IC chip sensor 9. Therefore, the control unit 17 can determines that the insert is the insert skimmer 50 when the metal is detected by the IC chip sensor 9 from the aforementioned time point.

(Specific Example of Operation of First Detection Process)

Figure 10:
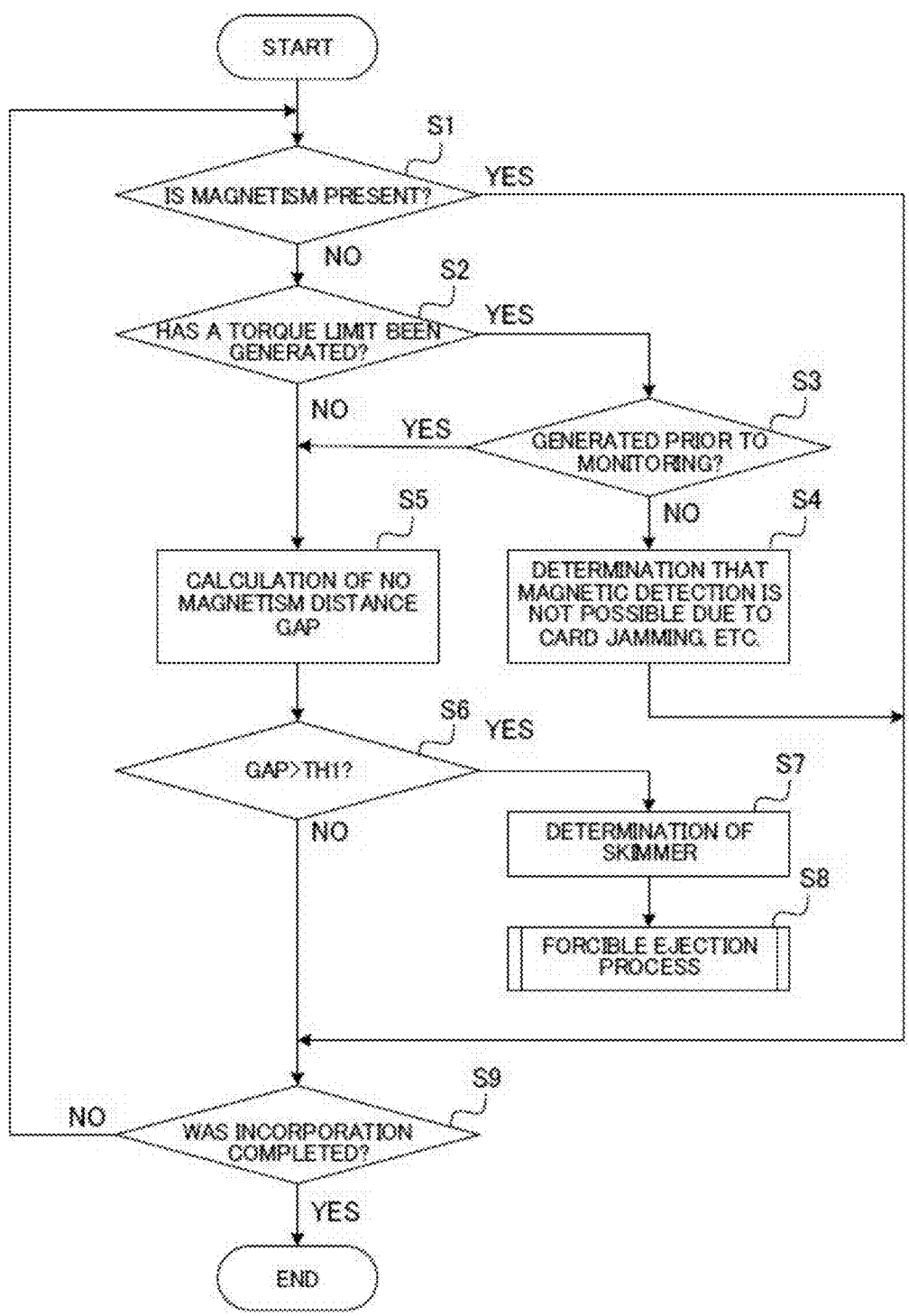
FIG. 10 is a flowchart for describing the details of an operation example when a control unit 17 of the card reader 1 performs a first detection process.

FIG. 10 is a flowchart for describing the details of an operation example when the control unit 17 of the card reader 1 performs the first detection process.

When the tip end of the insert (insert skimmer 50 or card 2) is detected by the card detection mechanism 15a, the control unit 17 starts the monitoring of the magnetism detected by the prehead 10. Moreover, when a signal is output from the prehead 10, the control unit 17 determines whether or not the magnetism is detected based on the signal (Step S1).

When the control unit 17 determined that the magnetism has been detected (Step S1: YES), the information contained in the magnetism detection associated with the time when the signal is output from the prehead 10 is stored in the RAM, and the process proceeds to Step S9. In Step S9, the control unit 17 determines whether or not the card insertion detection mechanism 14 is in the OFF state and the incorporation of the insert is completed, and in the case when the incorporation is completed (Step S9: YES), the first detection process is terminated, and when the incorporation is not completed (Step S9: NO), the process returns to Step S1.

The control unit 17 determines whether or not a torque limit function has been enabled (Step S2), when it is determined that the magnetism is not detected in Step S1 (Step S1: NO).

The torque limit function is the function restricts the torque so that the torque does not exceed the predetermined value when the torque of the motor 28 driving the conveyance rollers 26 becomes higher than the value normally required for conveyance. The torque limit function is enabled in the state in which card jamming occurs to the card 2 inserted in the card reader 1, and when the conveyance of the card 2 becomes impossible by a user grabbing the card 2. The determination of whether or not the torque limit function has been enabled can be performed by monitoring the output of the encoder 30 and the power supply voltage.

When it is determined in Step S2 that the torque limit function has not been enabled (Step S2: NO), the control unit 17 stores the information of no magnetism detection associated with the time when the signal is output from the prehead 10 and the number of detection pulses of the encoder 30 at this time in the RAM, and switches to Step S5.

When it is determined in Step S2 that the torque limit function has been enabled (Step S2: YES), the control unit 17 determines the timing at which the torque limit function is enabled, and when this timing is before the initiation of the first detection process (Step S3: YES), stores the information of no magnetism detection associated with the time when the signal is output from the prehead 10 and the number of detection pulses of the encoder 30 at this time in the RAM, and switches to Step S5.

When this timing is after the initiation of the first detection process (Step S3: NO), the control unit 17 determines the state in which the magnetism has not been detected due to card jamming or card grabbing (Step S4), stores the information of a torque limit associated with the information of no magnetism detection, and the time when the signal is output from the prehead 10 in the RAM, and the process proceeds to Step S9.

In Step S5, the control unit 17 extracts the information of no magnetism detection except for that associated with the information of the torque limit among the information of no magnetism detection stored in the RAM. Moreover, the control unit 17 converts the differences of the successive corresponding times among the number of detection pulses of the encoder 30 corresponding to the extracted information of no magnetism detection to a distance, and calculates the integrated value of this distance as a distance Gap which the insert moved in a state in which there is no detection of magnetism (Step S5).

Moreover, the control unit 17 determines whether or not the distance Gap exceeds a predetermined threshold TH1 (equivalent to the above-mentioned predetermined value) (Step S6), and the process proceeds to Step S9 when the distance Gap is the threshold TH1 or less (Step S6: NO).

When the distance Gap determined in Step S6 exceeds the threshold TH1 (Step S6: YES), the control unit 17 determines that the insert is the insert skimmer 50 (Step S7), and detects the insertion of the insert skimmer 50. Moreover, the control unit 17 performs the forced ejection process which forcibly ejects the insert skimmer 50 from the card conveyance path 7 (Step S8).

(Specific Example of Forced Ejection Process)

Figure 11:
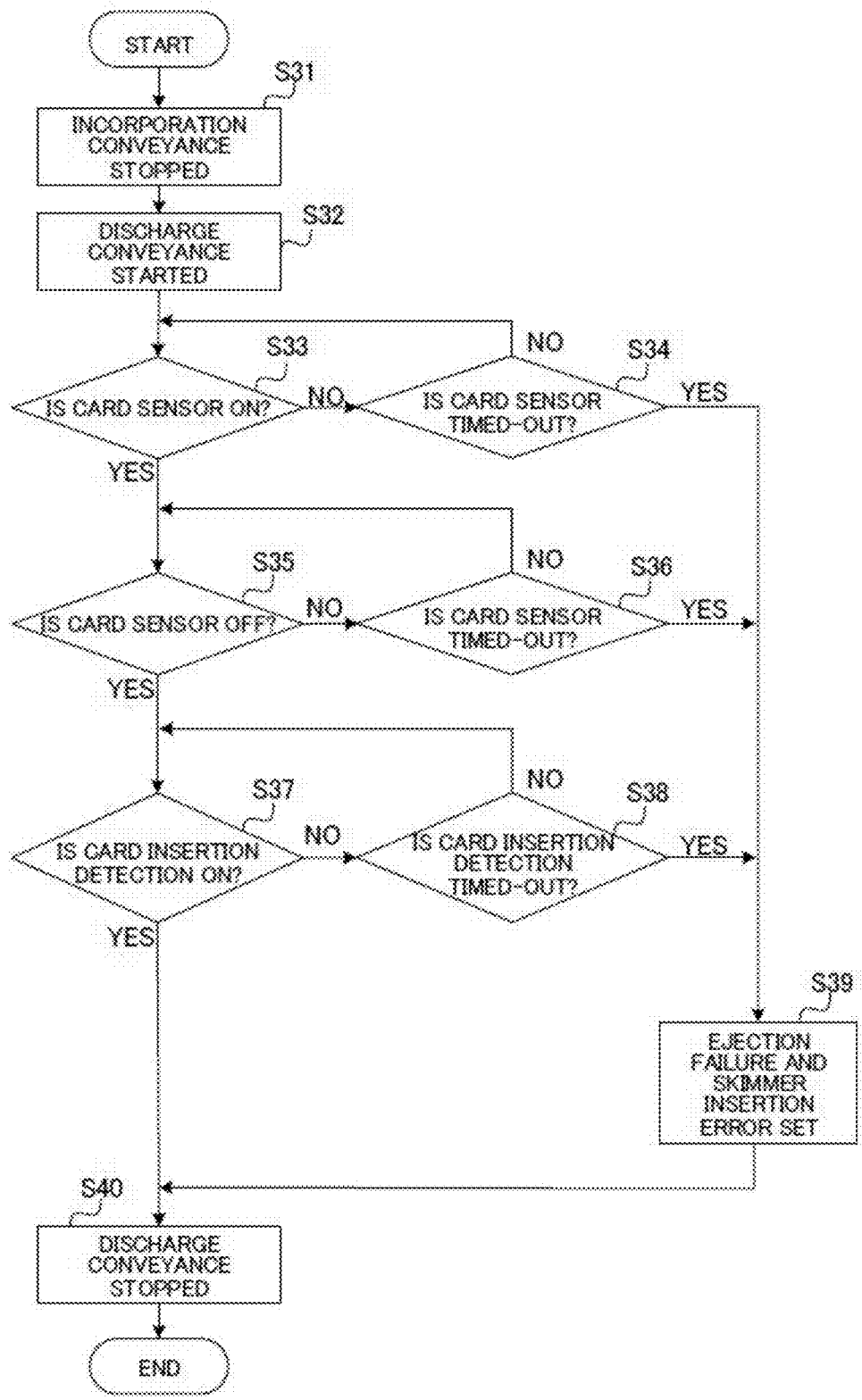
FIG. 11 is a flowchart for describing a forced ejection process of Step S8 shown in FIG. 10.

FIG. 11 is a flowchart for describing the forced ejection process of Step S8 shown in FIG. 10. First, the control unit 17 stops the conveyance by the conveyance rollers 26 to the rear side in the front and rear direction of the insert (Step S31), and rotates the conveyance rollers 26 in reverse to start the ejection and conveyance for conveying the insert to the front side of the front and rear direction (Step S32).

After Step S32, the control unit 17 determines whether or not the card detection mechanism 15a is in the ON state (Step S33), and when the card detection mechanism 15a is in the OFF state (Step S33: NO), determines whether or not the elapsed time from the start of the process in step S32 is in a timed-out state which is a predetermined time (Step S34).

When the control unit 17 is not timed out (Step S34: NO), the process returns to Step S33. When the control unit 17 is timed-out (Step S34: YES), the error information indicating that the insert skimmer 50 is inserted is recorded in the ROM in Step S39. After Step S39, the control unit 17 stops the driving of the conveyance roller 26 (Step S40).

When the process of Step S39 is performed, the control unit 17 returns an error to the request from the host device 3, and the incorporation operation of the card 2 is not performed until the error information recorded in the ROM is deleted. When the control unit 17 receives an error release request from the host device 3, the control unit 17 deletes the error information recorded in the ROM, and returns to a normal operation mode.

When the card detection mechanism 15a in Step S33 is determined to be in the ON state (Step S33: YES), the control unit 17 determines whether or not the card detection mechanism 15a is in the OFF state (Step S35), and when the ON state continues (Step S35: NO), determines whether or not the card detection mechanism 15a is in a timed-out state (Step S36). When the control unit 17 is not timed out (Step S36: NO), the process returns to Step S35, and when it is timed-out (Step S36: YES), the process of Step S39 is performed.

When it is determined that the card detection mechanism 15a is in the OFF state in Step S35 (Step S35: YES), the control unit 17 determines whether or not the card insertion detection mechanism 14 is in an ON state (Step S37), and when the card insertion detection mechanism 14 is in an OFF state (Step S37: NO), determines whether or not it is in a timed-out state (Step S38). The control unit 17 returns the process to Step S37 when it is not timed out (Step S38: NO), and performs the process of Step S39 when it is timed-out (Step S38: YES).

When it is determined in Step S37 that the card insertion detection mechanism 14 is in an ON state (Step S37: YES), the control unit 17 stops the driving of the conveyance roller 26 in Step S40. When the insert skimmer 50 is the one shown in FIG. 5B, the determination of Step S37 is YES, and is a state in which this insert skimmer 50 is forcibly ejected. When the insert skimmer 50 is the one shown in FIG. 5A, the determination of one of Step S34 to Step S38 is YES, and is a state in which this insert skimmer 50 is accommodated inside the main body part 6.

(Specific Example of Operation of Second Detection Process)

Figure 12:
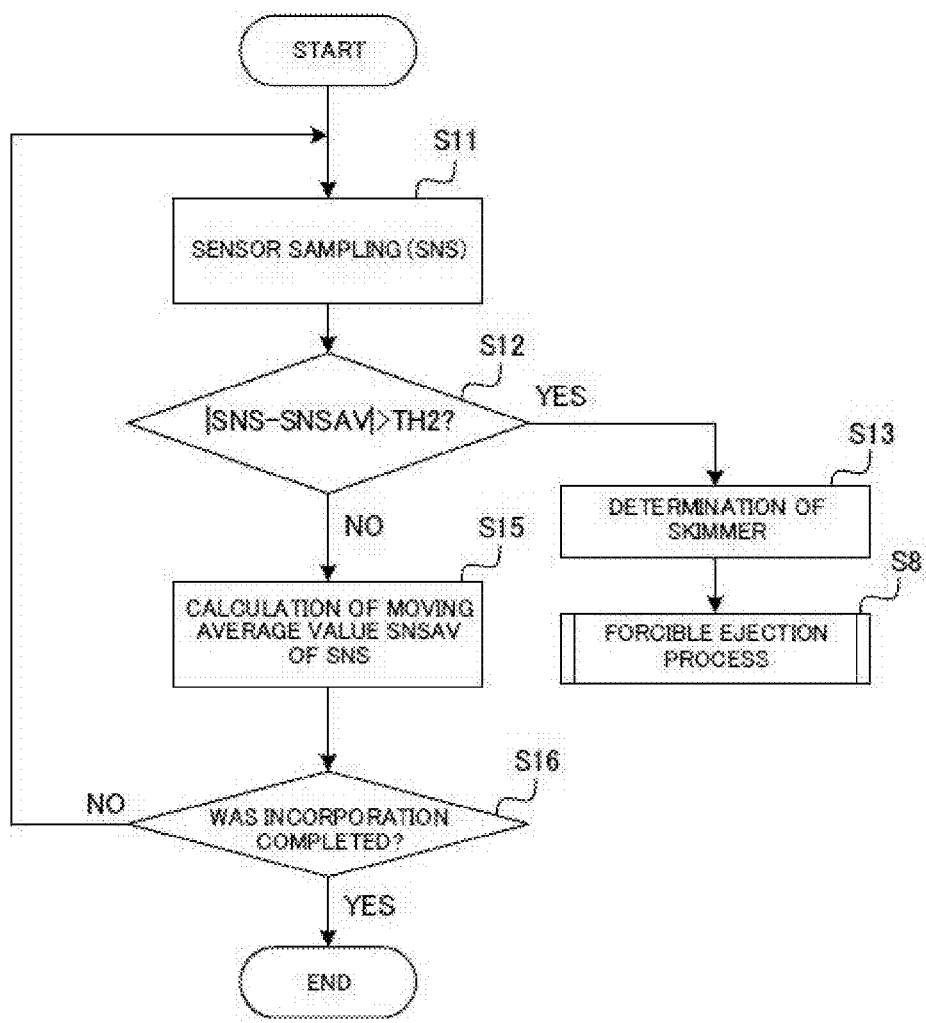
FIG. 12 is a flowchart for describing the details of an operation example when the control unit 17 of the card reader 1 performs a second detection process.

FIG. 12 is a flowchart describing the details of an operation example when the control unit 17 of the card reader 1 performs the second detection process. In FIG. 12, the same reference numerals are attached to the same processes as in FIG. 10.

When the tip end of the insert (insert skimmer 50 or card 2) is detected by the card detection mechanism 15*a*, the control unit 17 starts the monitoring of the output of the IC chip sensor 9. Moreover, if the control unit 17 acquires a signal Sns sampled by the IC chip sensor 9, it determines whether or not the metal has been detected based on this signal Sns.

Specifically, the control unit 17 acquires a moving average value SnsAv of the past signal Sns output from the IC chip sensor 9 after the second detection process is started, calculates the absolute value of the difference between this moving average value SnsAv and the signal Sns acquired in Step S11, and when this absolute value exceeds a predetermined threshold TH2 (Step S12: YES), determines that the metal is detected by the IC chip sensor 9, and judges that the insert is the insert skimmer 50 (Step S13). After Step S13, the forced ejection process shown in FIG. 11 is started in Step S8.

When the aforementioned absolute value is the threshold TH2 or less (Step S12: NO), the control unit 17 determines that the metal has not been detected by the IC chip sensor 9, and calculates the moving average value SnsAv of the past signal Sns containing the signal Ssn acquired in Step S11 (Step S15).

Then, when it is determined that the card insertion detection mechanism 14 is in the OFF state and the incorporation of the insert is completed (Step S16: YES), the control unit 17 terminates the second detection process, and when it is determined that the card insertion detection mechanism 14 remains in the ON state and the incorporation of the insert is not complete (Step S16: NO), the process returns to Step S11.

(Effect of the Card Reader of the Embodiment)

According to the first detection process performed by the card reader 1, if it is assumed that the insert skimmer 50 having a dummy magnetic stripe 51 having a shorter length in the front and rear direction than the legitimate card 2 at the tip end is inserted, the magnetism detection by the prehead 10 is performed where the magnetic stripe 51 of the insert skimmer 50 does not exist after the tip end of the insert skimmer 50 is detected by the card detection mechanism 15*a* in the main body part 6. Therefore, when the period in which the magnetism is not detected by the prehead 10 becomes long, it can be judged that the insert skimmer 50 is inserted, and the insertion of the insert skimmer 50 can be detected.

The first detection process performed by the card reader 1 is for detecting the insertion of the insert skimmer 50 using the prehead 10 mounted on an existing product, and can correspond to a firmware update of the existing product, thus, an increase in the cost of the product can be prevented.

Further, when an abnormality occurs in the torque of the conveyance roller 26 after the tip end of the insert is detected by the card detection mechanism 15*a* (namely, when the torque limit function is enabled), the first detection process performed by the card reader 1 stores the information of the torque limit and the information of no magnetism detection in association with the time at which the abnormality occurs. Moreover, when calculating the distance Gap in Step S5 in FIG. 10, the information (information associated with the information of the torque limit) of no magnetism detection corresponding to the time at which the abnormality occurs is excluded, and the distance Gap is calculated. Therefore, even when the legitimate card 2 is inserted, and a state such as card jamming by which the magnetism cannot be successfully detected from this card 2 occurs continuously can prevent this card 2 from being judged as being the insert skimmer 50, and the insertion of the insert skimmer 50 can be detected with a high accuracy.

Further, according to the second detection process performed by the card reader 1, even if an insert skimmer does not have a dummy magnetic stripe 51, the insert skimmer can be detected as long as the insert skimmer used metal in the main body part. Therefore, the crime prevention effect can be increased. Further, the second detection process is for detecting the insertion of the insert skimmer 50 using the IC chip sensor 9 mounted on an existing product, and can correspond to a firmware update of the existing product, thus, an increase in the cost of the product can be prevented.

(Modification Example of the Card Reader of the Embodiment)

The control unit 17 may detect that an object other than the legitimate card 2 (namely, the insert skimmer 50) has been inserted, when the state in which the magnetism is undetected by the prehead 10 continues, and the length of the period in which the magnetism is undetected continues is the threshold or more.

In order to detect the insert skimmer 50, the card reader 1 used an existing prehead 10 with the IC chip sensor 9, but may also use a configuration in which a dedicated magnetism sensor and a metal sensor for performing this detection are provided in the card insertion unit 5.

When set from the host device 3 to perform the first detection process, the control unit 17 does not have to perform the first detection process when the magnetism is not detected by the prehead 10 after the insertion of the insert is detected by the card insertion detection mechanism 14. In this case, the control unit 17 may move the shutter member 13 to the open position when the IC chip is detected by the IC chip sensor 9 after the insertion of the insert is detected by the card insertion detection mechanism 14. This configuration can prevent this card 2 from being detected as the insert skimmer 50 when the legitimate card 2 in which only an IC chip is installed and having no magnetic stripe is inserted.

The control unit 17 does not have to perform the second detection process when set from the host device 3 to perform the second detection process, when the magnetism is detected by the prehead 10 after the insertion of the insert is detected by the card insertion detection mechanism 14. In this case, the control unit 17 may move the shutter member 13 to the open position when the IC chip sensor 9 detected the metal after the insertion of the insert is detected by the card insertion detection mechanism 14. This configuration can prevent these legitimate cards from being detected as the insert skimmer 50 when a legitimate card such as a non-contact IC magnetic card accommodating a metallic magnetic card or metallic antenna is inserted.

The control unit 17 may perform the first detection process and the second detection process in parallel. In this case, the control unit 17 may perform the forced ejection process shown in FIG. 11 when the insertion of the insert skimmer 50 is detected by one of the first detection process and the second detection process. Alternatively, the control unit 17 may perform the forced ejection process shown in FIG. 11 when the insertion of the insert skimmer 50 is detected by both of the first detection process and the second detection process. The accuracy of the detection of the insertion of the insert skimmer 50 can be increased thereby.

The card reader 1 may have an interference magnetic field generation device in the vicinity of the insertion port 4. In this case, when the control unit 17 performs the first detection process or the second detection process, it is good to perform the detection of the magnetism by the prehead 10 and the detection of the metal by the IC chip sensor 9 in the period in which is controlled so as to intermittently generate the magnetism from the interference magnetic field generation device, or in which the magnetism is not generated from the interference magnetic field generation device.

When it is determined that the insert is the insert skimmer 50, the control unit 17 may store the error information in the ROM and terminate the operation without performing the forced ejection process. In this case, the control unit 17 notifies the host device 3 that the insert skimmer 50 is inserted. Moreover, in response to this notification, the administrator of the host device 3 may perform measures such as removing the insert skimmer 50.

In an operation example of FIG. 10, Step S2, Step S3 and Step S4 are not necessary and may be omitted.

As described above, this specification discloses the following content.

(1)

A card reader comprising:
a magnetic detector structured to detect magnetism from a card inserted into an insertion port;
a main body part including a card conveyance path in which the card inserted from the insertion port is conveyed; and
a card detection sensor disposed in the main body part and structured to detect a tip end of the card in an insertion direction of the card, wherein
the magnetic detector and the card detection sensor are disposed at a distance less than a length of the card in the insertion direction,
the card reader further comprising
a control unit structured to start monitoring of the magnetism detected by the magnetic detector when the card detection sensor detects a tip end of an insert inserted into the insertion port, and detect that an object other than the card has been inserted when a movement distance of the insert in a period in which the magnetism is undetected by the magnetic detector is a predetermined value or more.

It is assumed that an insert skimmer having at a tip end part, a dummy magnetic stripe of a shorter length than the legitimate card is inserted. According to (1), the magnetism detection by the magnetic detector is performed where the magnetic stripe of the insert skimmer does not exist after the tip end of the insert skimmer is detected by the card detection sensor in the main body part. Therefore, when the movement distance of the insert in the period in which the magnetism is undetected is large, it can be judged that the insert is the insert skimmer, and the insertion of the insert skimmer can be detected.

(2)

The card reader according to (1), comprising:
a conveyance roller structured to convey the card on the card conveyance path; and
an encoder structured to detect an amount of rotation of the conveyance roller, wherein
the control unit obtains the movement distance based on an output of the encoder.

According to (2), the movement distance can be accurately and easily obtained.

(3)

The card reader according to (2), wherein
when an abnormality occurs in torque of the conveyance roller after the tip end of the insert is detected by the card detection sensor, the control unit excludes a period in which the abnormality is occurring from the period in which the magnetism is undetected.

According to (3), even if the card does not move, regardless of whether the conveyance roller is rotating, due to the occurrence of card jamming and card grabbing by a user, the period in which the card jamming and the card grabbing occur is excluded in order to determine the period in which the magnetism is undetected, thus, the likelihood that the legitimate card is judged as the insert skimmer can be reduced.

(4)

The card reader according to (1), wherein
the control unit does not monitor the magnetism when the magnetism is not detected by the magnetic detector in a state in which the insert is inserted in the insertion port.

According to (4), it can be prevented from judging that this card is the insert skimmer when the legitimate card having only an IC chip is inserted.

(5)

The card reader according to (1), comprising
a metal detector structured to detect metal from the card inserted into the insertion port, wherein
the control unit starts monitoring of an output of the metal detector after the tip end of the insert is detected by the card detection sensor, and detects that an object other than the card has been inserted when the metal is detected by the metal detector.

According to (5), even if the insert skimmer does not have a dummy magnetic stripe, the insert skimmer can be detected as long as the insert skimmer used metal in the main body part.

(6)

The card reader according to (5), wherein
the control unit does not monitor the output of the metal detector when the magnetism is detected by the magnetic detector in a state in which the insert is inserted in the insertion port.

According to (6), it can be prevented from judging that this card is the insert skimmer when a legitimate card such as a non-contact IC magnetic card with a built-in metallic magnetic card or metallic antenna is inserted.

(7)

A foreign matter detection method for a card reader comprising a magnetic detector structured to detect magnetism from a card inserted into an insertion port, a main body part including a card conveyance path in which the card inserted from the insertion port is conveyed, and a card detection sensor disposed in the main body part and structured to detect a tip end of the card in an insertion direction of the card, wherein
the magnetic detector and the card detection sensor are disposed at a distance less than a length of the card in the insertion direction, the foreign matter detection method comprising
starting monitoring of the magnetism detected by the magnetic detector when the card detection sensor detects a tip end of an insert inserted into the insertion port, and detecting that an object other than the legitimate card has been inserted when a movement distance of the insert in a period in which the magnetism is undetected by the magnetic detector is a predetermined value or more.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader for use with a card, the card reader comprising:
    a magnetic detector structured to detect magnetism from the card inserted into an insertion port;
    a main body part comprising a card conveyance path in which the card inserted from the insertion port is conveyed; and
    a card detection sensor disposed in the main body part and structured to detect a tip end of the card in an insertion direction of the card, wherein
    the magnetic detector and the card detection sensor are disposed at a distance less than a length of the card in the insertion direction,
    the card reader further comprising a control unit structured to start monitoring of the magnetism detected by the magnetic detector when the card detection sensor detects a tip end of an insert inserted into the insertion port, and detect that an object other than the card has been inserted when a movement distance of the insert in a period in which the magnetism is undetected by the magnetic detector is a predetermined value or more.

2. The card reader according to claim 1, comprising:
    a conveyance roller structured to convey the card on the card conveyance path; and
    an encoder structured to detect an amount of rotation of the conveyance roller, wherein
    the control unit is structured to obtain the movement distance based on an output of the encoder.

3. The card reader according to claim 2, wherein
when an abnormality occurs in torque of the conveyance roller after the tip end of the insert is detected by the card detection sensor, the control unit excludes a period in which the abnormality is occurring from the period in which the magnetism is undetected.

4. The card reader according to claim 3, wherein
the control unit does not monitor the magnetism when the magnetism is not detected by the magnetic detector in a state in which the insert is inserted in the insertion port.

5. The card reader according to claim 4, comprising
a metal detector structured to detect metal from the card inserted into the insertion port, wherein
the control unit is structured to start monitoring of an output of the metal detector after the tip end of the insert is detected by the card detection sensor, and detect that an object other than the card has been inserted when the metal is detected by the metal detector.

6. The card reader according to claim 5, wherein
the control unit does not monitor the output of the metal detector when the magnetism is detected by the magnetic detector in a state in which the insert is inserted in the insertion port.

7. The card reader according to claim 3, comprising
a metal detector structured to detect metal from the card inserted into the insertion port, wherein
the control unit is structured to start monitoring of an output of the metal detector after the tip end of the insert is detected by the card detection sensor, and detects that an object other than the card has been inserted when the metal is detected by the metal detector.

8. The card reader according to claim 7, wherein
the control unit does not monitor the output of the metal detector when the magnetism is detected by the magnetic detector in a state in which the insert is inserted in the insertion port.

9. The card reader according to claim 2, wherein
the control unit does not monitor the magnetism when the magnetism is not detected by the magnetic detector in a state in which the insert is inserted in the insertion port.

10. The card reader according to claim 9, comprising
a metal detector structured to detect metal from the card inserted into the insertion port, wherein
the control unit is structured to start monitoring of an output of the metal detector after the tip end of the insert is detected by the card detection sensor, and detect that an object other than the card has been inserted when the metal is detected by the metal detector.

11. The card reader according to claim 10, wherein
the control unit does not monitor the output of the metal detector when the magnetism is detected by the magnetic detector in a state in which the insert is inserted in the insertion port.

12. The card reader according to claim 2, comprising
a metal detector structured to detect metal from the card inserted into the insertion port, wherein
the control unit is structured to start monitoring of an output of the metal detector after the tip end of the insert is detected by the card detection sensor, and detect that an object other than the card has been inserted when the metal is detected by the metal detector.

13. The card reader according to claim 12, wherein
the control unit does not monitor the output of the metal detector when the magnetism is detected by the magnetic detector in a state in which the insert is inserted in the insertion port.

14. The card reader according to claim 1, wherein
the control unit does not monitor the magnetism when the magnetism is not detected by the magnetic detector in a state in which the insert is inserted in the insertion port.

15. The card reader according to claim 14, comprising
a metal detector structured to detect metal from the card inserted into the insertion port, wherein
the control unit is structured to start monitoring of an output of the metal detector after the tip end of the insert is detected by the card detection sensor, and detect that an object other than the card has been inserted when the metal is detected by the metal detector.

16. The card reader according to claim 15, wherein the control unit does not monitor the output of the metal detector when the magnetism is detected by the magnetic detector in a state in which the insert is inserted in the insertion port.

17. The card reader according to claim 1, comprising a metal detector structured to detect metal from the card inserted into the insertion port, wherein
the control unit is structured to start monitoring of an output of the metal detector after the tip end of the insert is detected by the card detection sensor, and detect that an object other than the card has been inserted when the metal is detected by the metal detector.

18. The card reader according to claim 17, wherein the control unit does not monitor the output of the metal detector when the magnetism is detected by the magnetic detector in a state in which the insert is inserted in the insertion port.

19. A foreign matter detection method for a card reader comprising a magnetic detector structured to detect magnetism from a card inserted into an insertion port, a main body part including a card conveyance path in which the card inserted from the insertion port is conveyed, and a card detection sensor disposed in the main body part and structured to detect a tip end of the card in an insertion direction of the card, wherein the magnetic detector and the card detection sensor are disposed at a distance less than a length of the card in the insertion direction,
the foreign matter detection method comprising
starting monitoring of the magnetism detected by the magnetic detector when the card detection sensor detects a tip end of an insert inserted into the insertion port, and detecting that an object other than the card has been inserted when a movement distance of the insert in a period in which the magnetism is undetected by the magnetic detector is a predetermined value or more.

* * * * *